Patented Feb. 23, 1937

2,071,524

UNITED STATES PATENT OFFICE 2,071,524

PROCESS FOR THE PRODUCTION OF LACQUERS AND LACQUER STARTING MATERIALS CONTAINING ARTIFICIAL RESINS

Richard Hessen, Bautzen, Germany

No Drawing. Application March 21, 1933, Serial No. 661,998. In Germany November 10, 1931

2 Claims. (Cl. 134—26)

The invention relates to the production of filling lacquers, which contain artificial resins, particularly phenol-formaldehyde artificial resins, as well as fillers, colouring matters and the like and particularly to the production of lacquer starting materials of the aforesaid kind, from which lacquer solutions can be prepared with the aid of suitable solvents.

The method hitherto adopted for preparing lacquer solutions from artificial resin lacquers, was to dissolve the artificial resins, of the resol or novolac type, in the presence of substances, containing reactive methylene groups, in suitable solvents, such as alcohol, acetone and the like and to add to these solutions insoluble fillers of every kind, such as white lead, zinc oxide, kaolin, blanc fixe, filling-up etc. and to treat the mixtures in ball mills or other suitable apparatus until the fillers were extremely finely ground and the lacquers could be regarded as being homogeneous.

These processes have as one of their disadvantages, that they require a considerable time until the requisite fineness of grain is attained. Moreover, on standing, a solid, hard deposit settles out from the lacquer solution, which deposit after standing for some time becomes so hard that it can only be comminuted with difficulty. In addition the disadvantage exists that the finished lacquer solutions have to be prepared and transported as required, whereby, owing to evaporation, losses of the easily volatile solvents occur and there is an attendant risk of fire.

Moreover the lacquer coatings prepared from these lacquer solutions are not particularly satisfactory.

The object of this invention is to provide a process, with the aid of which the disadvantages hitherto existing can be overcome and certain advantages can be obtained.

According to the invention a lacquer starting material is first prepared.

This lacquer starting material, which contains the artificial resin employed in a soluble and hardenable condition or soluble resins, capable of being hardened by the addition of hardening agents, and also fillers, colouring matters and other solid and insoluble materials employed with these filling lacquers, can be worked up without difficulty in the usual solvents at the place of application to a homogeneous lacquer solution, whereby the hardened lacquer coatings show excellent properties and are far superior to those hitherto prepared.

It has now been found that, in the treatment of resins and the substrata necessary for the lacquer coatings as well as colouring materials, preferably with all of these substances, in any case, however, with those substrata, which bring about the usual disturbances, under the application of pressure and heat, for example by a kneading process at elevated temperatures, the substances become so finely distributed in the resin that, on dissolving the product, the substrata remains finely and homogeneously suspended in the lacquer. The resin, during the kneading process, penetrates into the grains of the colouring matter or of the filler, so that, on dissolving in suitable solvents, the insoluble grains become loosened and finely distributed. The temperature during this pressure treatment is preferably such that the resin is liquid, without passing over into its final condition. The duration and temperature of the pressure treatment are to be so selected that the volatile constituents, water, free phenols, aldehyde and the like, can escape. The use of high pressures is advantageous in order to ensure more perfect penetration of the resin which has become soft or liquid into the grains.

The process may be carried out in a heated masticator or with the aid of kneading rollers. This process is with advantage carried out on a pair of heated kneading rollers in which the speed of the rollers is different, whereby compressing and frictional effects are obtained. The use of particularly high pressures is rendered possible if the previously finely powdered and purely mechanically divided mixture is passed through heated nozzles under pressure, whereby the advantage is obtained that the operation need not be carried out in batches but continuously and that the product obtained always possesses uniform properties.

When operating according to the process of this invention the formation of lumps, consisting of agglomerated particles not completely impregnated by resin or resin solution, on dissolving the lacquers, is excluded. This lump formation cannot be avoided if the initial products are merely mechanically mixed without the application of heat and pressure. Such mixing yields a product, which is with difficulty, or only partially, soluble to a lacquer. The process of the invention, when using resols, i. e. hardenable artificial resins, yields lacquer coatings, which are not only distinguished by a higher fastness to light, but which also show an extraordinarily high resistance to alkalies and other chemicals.

The masses prepared according to the invention can be comminuted or ground. The powdered mass is introduced into the solvent, readily forms a homogeneous suspension and solution without lump formation and avoiding any tedious wet-grinding process. In the suspended and dissolved condition the lacquer solutions, for example the solutions in spirits, possess the surprising property of remaining permanently practically homogeneous, and that practically no hard deposit settles out on standing so that the homogeneous suspension is again produced by simple stirring.

What I claim is:

1. A process for the production of lacquers and lacquer starting materials of filling lacquers free from material forming hard non-suspensible deposits and containing artificial resin, which comprises subjecting a resol resin to heat and pressure in the presence of an insoluble solid granular filling material and in the substantial absence of solvents so that the resol is plasticized and caused to penetrate into the grains of the filling material while permitting volatile constituents to escape, terminating the operation of the heat and pressure before a substantial change of the resol occurs, and dissolving the resol in a solvent therefor in order to prepare a lacquer solution having the grains of filling material distributed and suspended therein.

2. A process for the production of lacquers and lacquer starting materials of filling lacquers free from material forming hard non-suspensible deposits and containing artificial resin which comprises subjecting a soluble and hardenable artificial resin to heat and pressure in the presence of an insoluble solid granular filling material and in the substantial absence of solvents so that the resin is plasticized and caused to penetrate into the grains of the filling material, reducing the heat and pressure before a substantial change of the resin occurs, and dissolving the resin in a solvent therefor in order to prepare a lacquer solution having the grains of filling material distributed and suspended therein.

RICHARD HESSEN.